Sept. 12, 1967 L. P. VANDERHAGEN 3,340,555
SOLE CUTTING APPARATUS
Filed May 18, 1964 2 Sheets-Sheet 1

INVENTOR.
Lawrence P. Vanderhagen
BY James R. Hulen
ATTORNEY

Sept. 12, 1967  L. P. VANDERHAGEN  3,340,555
SOLE CUTTING APPARATUS

Filed May 18, 1964  2 Sheets-Sheet 2

INVENTOR.
Lawrence P. Vanderhagen
BY James R. Hulen
ATTORNEY

United States Patent Office 3,340,555
Patented Sept. 12, 1967

3,340,555
SOLE CUTTING APPARATUS
Lawrence P. Vanderhagen, Mishawaka, Ind., assignor to Wellman Company, Medford, Mass., a corporation of Maine
Filed May 18, 1964, Ser. No. 368,131
7 Claims. (Cl. 12—86.6)

This invention relates to sole cutting machines and, more particularly, to a sole cutting machine in which the cutting knife is driven at an increasing speed for the sole cutting revolution and at a decreasing speed for the stock indexing revolution.

In an automatic sole cutting machine, such as that described in United States Patent No. 3,006,006 to H. R. Polleys, issued on Oct. 31, 1961, the machine may be continuously operated by actuation of a foot pedal or other actuating means. During this automatic operation, the cutting knife is continuously driven about a circuitous path and a stock clamping table intermittently moves sole stock into the path of the knife for a sole cutting revolution of the knife and out of the path of the knife during a stock indexing revolution of the knife. During the indexing revolution, the sole stock must be shifted manually by an operator, or by other means, relative to the clamping table so that an uncut portion of the stock will be in position for the next cutting operation.

Heretofore, the cutting knife was driven at a uniform speed at all times for both the cutting revolution and the stock indexing revolution. Since a specific amount of time was required to shift the stock, the knife speed and, therefore, the machine output, was limited by the indexing operation. If the indexing was done manually, the limitation was based on the operator's ability to work at a given rate for a prolonged period of time. On the other hand, if the indexing was automatic, the limitation was based on the size and flexibility of the equipment necessary to perform such a rapid indexing operation. In any event, it has been found to be impossible to achieve the desired increased machine output by maintaining the same uniform knife speed for cutting and indexing.

Accordingly, it is an object of this invention to improve the output of a sole cutting machine without unduly increasing the burden on the operator or indexing equipment.

A further object is to provide a sole cutting machine with a means for achieving increased speeds for cutting and decreased speeds for indexing.

These and other objects are accomplished by equipping an improved sole cutting machine, which comprises a cutting knife, a drive means for driving the knife in a circuitous path, a table means for moving sole stock into the knife path during a cutting revolution of the knife and for moving the stock out of the path during an indexing revolution of the knife, and a motor for supplying uniform rotary power, with a speed control means which operatively interconnects the knife drive means and the motor for varying the speed of the knife about the path, so that, the knife is caused to travel at an increasing speed during the cutting revolution and at a decreasing speed during the indexing revolution.

Other objects and advantages of this invention will become apparent from the following description used in conjunction with the accompanying drawings, wherein is set forth by way of illustration an example of an embodiment of this invention.

Figure 1:
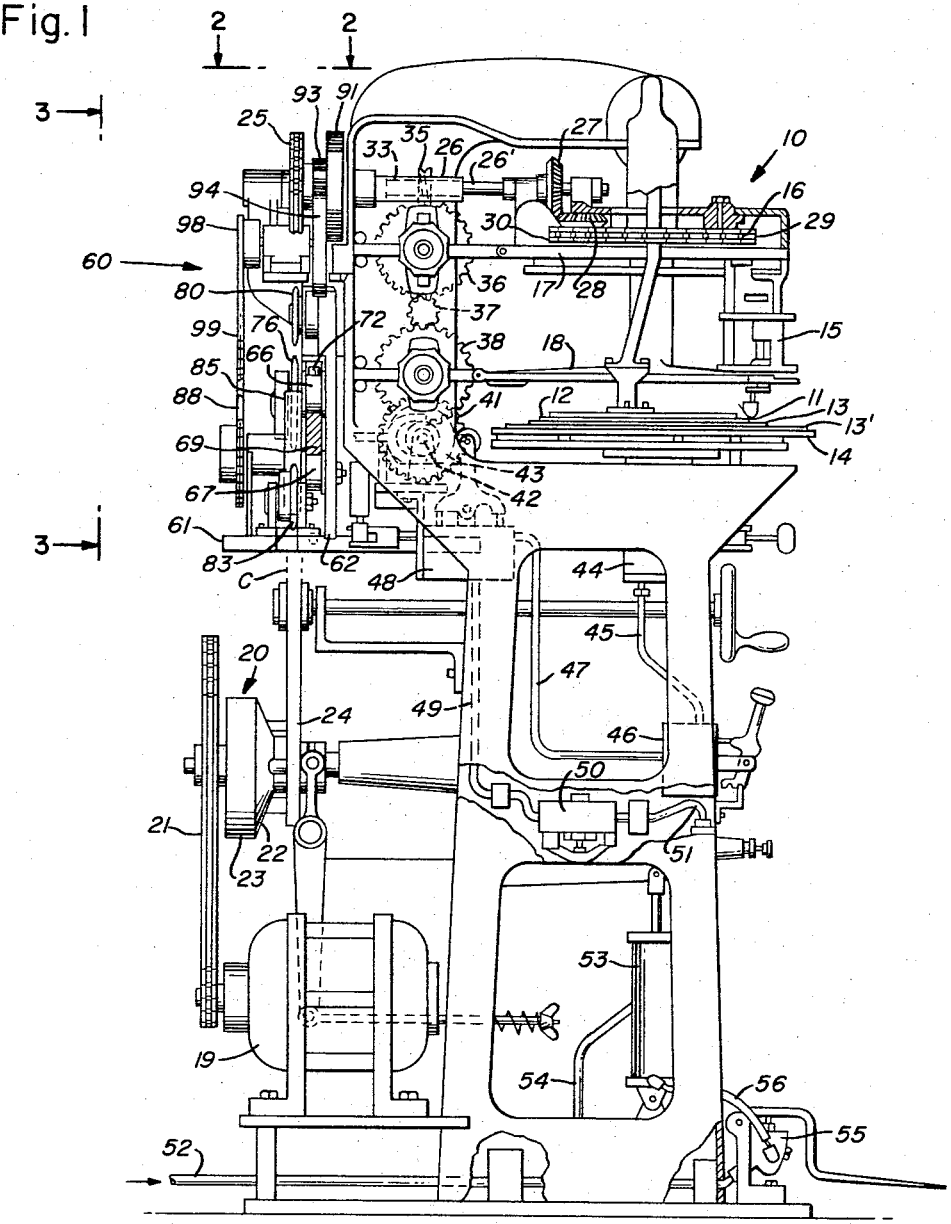
FIG. 1 is a side elevational view of the improved sole cutting machine showing the position and interrelationship of the parts thereof and embodying the invention.

As shown in FIG. 1 of the drawings, this invention is illustrated in connection with a cutting machine of the type particularly disclosed in the aforementioned United States Patent No. 3,006,006. The machine shown generally at 10 comprises a cutting knife 11 which is driven in a circuitous path about a templet or form 12 having the shape of the article to be cut from a sheet of stock 13, which is supported on a cutting pad 13'. Stock 13 is clamped between templet 12 and pad 13' by a reciprocating table 14.

Knife 11 is driven in a circuit around templet 12 by a carriage 15, which is directly connected to and driven by a chain 16 and guided in a circuit about templet 12 by upper and lower leaders or guide tracks 17 and 18. Guide tracks 17 and 18 are particularly shown and described in the United States patent to Patten, No. 1,270,319, issued June 6, 1922. Chain 16 is driven by a motor 19 through a clutch 20 which is operatively connected to the motor by a chain 21. If the engageable and disengageable parts 22 and 23 of clutch 20 are engaged, knife 11 is driven from clutch 20 through sprocket 24 and chain C, which meshes with sprocket 25 keyed to shaft 26. Shaft 26' is driven by a slidable connection with shaft 26, and drives chain 16 through a bevel gear 27 which meshes with a bevel gear 28. Chain 16 passes around sprockets 29 and 30 and is driven by sprocket 30 which is rotatably mounted on a stud and affixed to bevel gear 28.

Track guides 17 and 18 are slidably moved by a train of gears which are driven from shaft 26 by a gear 31 (see FIG. 2) affixed thereto. Gear 31 is in meshing engagement with gear 32 which is keyed to a shaft 33, on which is keyed spiral gear 35. Gear 35 drives the train of gears 36, 37 and 38 which reciprocates track guides 17 and 18.

A gear (not shown) fixed to gear 38 is adapted to drive gear 41 which is mounted on a shaft 42. A wide based cam 43, mounted on shaft 42 and affixed to gear 41, controls the rise and fall movements of table 14 and synchronizes them with the travel of the knife 11 by allowing fluid under pressure to be admitted to and exhausted from the lower end of cylinder 44 to operate the piston therein. This lifts and drops table 14. The mechanism for performing such functions is described more fully in the aforementioned Patent No. 3,006,006.

As described in United States Patent No. 2,469,518, issued to H. R. Polleys on May 10, 1949, the movement of the sole stock by the supporting table into and out of the path of the cutting knife is controlled by and is synchronized with the travel of the knife in such a manner that when the knife has started to operate, the machine may be operated continuously at a substantially high speed while all of the soles are cut from a single piece of sheet stock. During such operations, the stock is automatically carried into the path of the knife and removed therefrom while the knife is in the desired position on its path of travel to cause the knife to enter and be withdrawn from the cut at the desired preselected position on the edge of the soles being cut.

The table 14 is reciprocated through one cycle, that is moved up and down, during the time the knife travels twice around its path of movement. The stock is held in the path of the knife while the knife makes slightly more than one revolution, and it is held out of the path of the knife while it completes the remaining portion of the revolution. Such operating characteristics are obtained by driving the cam 43 through one revolution while the knife 11 is driven through two revolutions, and making the high portion of the cam extend through an angle of slightly more than 180°.

It is seen that table 14 is actuated by the extension and retraction of the piston in cylinder 44. Fluid to actuate cylinder 44 is supplied through pipes 45, valve 46, pipe 47, valve 48, pipe 49, 3-way valve 50, pipe 51, and inlet supply pipe 52. Fluid to actuate cylinder 53 (which in turn actuates clutch 20) is supplied from pipe 54, normally closed foot valve 55, and pipe 56.

Figure 2:
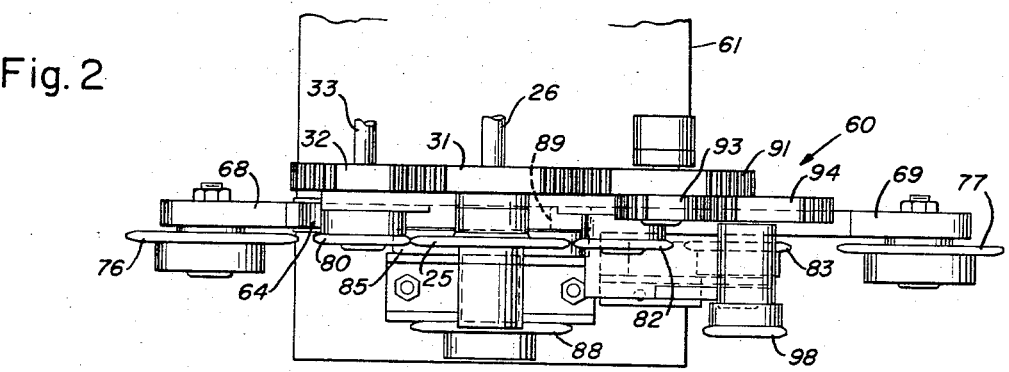
FIG. 2 is a top plan view of the invention taken along line 2—2 of FIG. 1.
Figure 3:
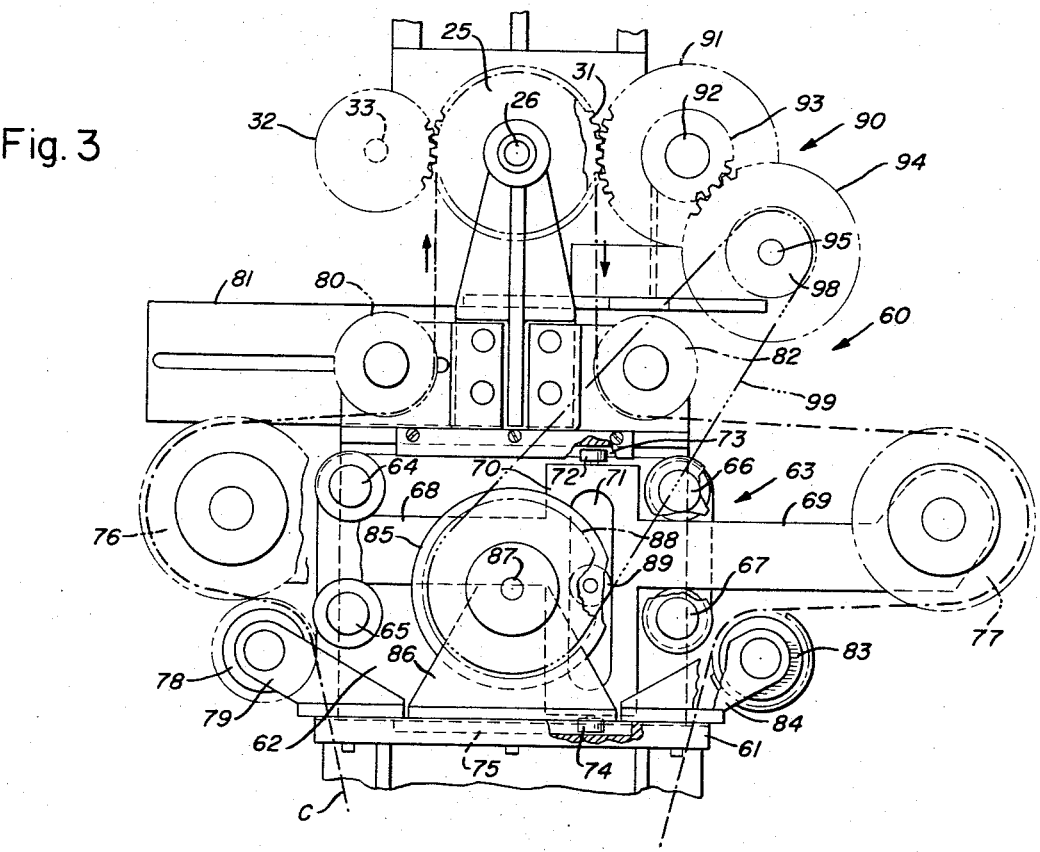
FIG. 3 is a side elevational view taken along line 3—3 of FIG. 1. Parts have been broken away for clarity.

The improvement embodying the present invention, as shown herein, is a knife speed control mechanism shown generally at 60 in FIGS. 1, 2 and 3. The mechanism 60 is secured by a plate 61 to the frame of machine 10. A vertically extending support plate 62 is secured to the upper surface of plate 61. A slide shown generally at 63 in FIG. 3 is supported on vertical support plate 62 by four flanged rollers 64, 65, 66 and 67 which are rotatably supported by plate 62. Slide 63 has a horizontally extending slide portion 68 which is adapted to slide between rollers 64 and 65 and a slide portion 69 which is adapted to slide between rollers 66 and 67. An integral center block 70 having a vertically disposed slot 71 connects portions 68 and 69. A roller 72 is rotatably secured to the top of block 70 and provides rolling support for slide 63 in groove 73. Similarly, roller 74 is rotatably secured to the bottom of block 70 and rolls within groove 75 formed in plate 61.

A sprocket 76 is rotatably supported on the end of portion 68 and a sprocket 77 is rotatably mounted at the other end of slide 63 on the end of portion 69. Drive chain C which interconnects the drive motor 19 and drive sprocket 25, is trained around sprocket 76 as it travels from the motor 19 to sprocket 25 and is trained around sprocket 77 as it travels from sprocket 25 to the motor.

An idler sprocket 78, which contacts and supports drive chain C between motor 19 and sprocket 76, is rotatably supported by bracket 79 on plate 61. An idler sprocket 80 is adjustably mounted for rotation on plate 81 and contacts that portion of the chain which extends between sprockets 76 and 25. An idler sprocket 82 is rotatably mounted on vertical support plate 62 and contacts that portion of the chain that extends between sprockets 25 and 77. An idler sprocket 83, which contacts chain C between sprocket 77 and motor 19, is rotatably mounted on bracket 84 on top of plate 61.

In order to provide means for reciprocating slide 63 in a horizontal plane, a crank 85 is provided. Crank 85 is rotatably mounted on bracket 86 which is secured to the top of plate 61. Crank 85 is keyed to shaft 87 which also has a crank drive sprocket 88 keyed thereto. Roller 89 is rotatably mounted on crank 85 and extends into slot 71 in block 70. The rotation of crank 85 causes roller 89 to reciprocate slide 63 as the roller moves up and down in slot 71 in a well-known manner.

A crank drive mechanism shown generally at 90 is provided for imparting continuous rotary motion to crank 85. A gear 91 is rotatably mounted on the frame of machine 10 and is positioned to be in meshing engagement with gear 31 which is keyed to knife drive shaft 26. Gear 91 is keyed to a rotatably mounted shaft 92 which also has gear 93 keyed thereto. A gear 94 is keyed to rotatably mounted shaft 95 in meshing engagement with gear 93 and a sprocket 98 is keyed to shaft 95 and connected to crank drive sprocket 88 by a chain 99. Accordingly, the rotation of gear 31 by drive chain C will result in the rotation of crank 85 via gears 91, 93, and 94 and sprockets 98 and 88.

In the operation of the machine, the function of slide 63 with sprockets 76 and 77 rotatably mounted on the ends thereof, is to vary the speed of cutting knife 11 from an increasing speed during the cutting revolution of the knife to a decreasing speed during the stock indexing revolution of the knife. This speed variation of the cutting knife accomplishes the purpose of increasing the production of machine 10 without unduly overburdening the operator or indexing equipment of the machine.

If slide 63 were held in a stationary position, drive chain C would deliver a uniform rotary speed to sprocket 25, as is the case with the standard sole cutting machine described in the aforementioned U.S. Patent No. 3,006,006. However, as slide 63 is driven from right to left (as viewed in FIG. 3) by mechanism 90, that portion of the chain in contact with sprocket 76 is forced to the left and therefore has a greater distance to travel, thus, resulting in a decreasing of the rotary speed of sprocket 25. Accordingly, as crank 85 continues to rotate, slide 63 will be driven from left to right and that portion of the chain in contact with sprocket 77 will be rapidly pulled around sprocket 25 to increase the speed of the sprocket for the cutting operation.

It will be apparent that this invention provides a new and improved sole cutting machine that enables the operator to substantially increase production of the machine without unduly overburdening the operator or indexing equipment.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true scope and spirit of the invention.

Having thus described my invention, what I claim and desire to protect by Letters Patent is:

1. A sole cutting machine comprising: a cutting knife; a drive means for driving said knife in a circuitous path; a table means for moving sole stock into said knife path during a cutting revolution of said knife and for moving said stock out of said path during an indexing revolution of said knife; a motor for supplying uniform rotary power; and speed control means operatively interconnecting said drive means and said motor for varying the speed of said knife about said path, so that, said knife is caused to travel at an increasing speed during said cutting revolution and at a decreasing speed during said indexing revolution.

2. A sole cutting machine comprising: a cutting knife; a drive means for driving said knife in a circuitous path; a table means for moving sole stock into said knife path during a cutting revolution of said knife and for moving said stock out of said path during an indexing revolution of said knife; a motor for supplying uniform rotary power; a drive chain interconnecting said drive means and said motor; and speed control means associated with said chain for varying the speed of said knife about said path, so that, said knife is caused to travel at an increasing speed during said cutting revolution and at a decreasing speed during said indexing revolution.

3. A sole cutting machine comprising: a cutting knife; a drive means for driving said knife in a circuitous path, said drive means having a drive shaft with a drive sprocket secured thereto; a table means for moving sole stock into said knife path during a cutting revolution of said knife and for moving said stock out of said path during an indexing revolution of said knife; a motor for supplying uniform rotary power; a drive chain interconnecting said sprocket and said motor; and speed control means associated with said chain intermediate said motor and said drive sprocket for varying the speed of said drive sprocket and said shaft, so that, said knife is caused to travel at an increasing speed during said cutting revolution and at a decreasing speed during said indexing revolution.

4. The machine of claim 3 wherein said speed control means comprises: a slide means mounted for reciprocal movement intermediate said motor and said drive sprocket; means for reciprocating said slide means; a first sprocket mounted on one end of said slide means for contacting said chain as said chain travels from said motor to said drive sprocket; and a second sprocket mounted on the other end of said slide means for contacting said chain as said chain travels from said drive sprocket to said motor, so that, the movement of said slide means in a first direction will cause said chain to rotate said drive sprocket at said increasing speed and the movement of said slide means in a second direction will cause said chain to rotate said drive sprocket at said decreasing speed.

5. The machine of claim 3 wherein said speed control means comprises: a slide means mounted for reciprocal movement intermediate said motor and said drive sprocket; a first sprocket mounted on one end of said slide means; a second sprocket mounted on the other end of said slide means, said chain being trained about said first sprocket when traveling from said motor to said drive sprocket and about said second sprocket when traveling from said drive sprocket to said motor; and means for reciprocating said slide means.

6. The machine of claim 5 wherein said slide has a vertically extending slot therein and said slide reciprocating means comprises a rotatably mounted crank having a roller thereon extending into said slot, and means for rotating said crank, so that, the rotation of said crank will cause said slide to reciprocate with said first and second sprockets in contact with said chain.

7. The machine of claim 6 wherein said crank rotating means comprises a drive means that is connected to said knife drive shaft and operated thereby.

References Cited
UNITED STATES PATENTS

| | | | |
|---|---|---|---|
| 1,270,319 | 6/1918 | Patten | 12—86.6 |
| 2,469,518 | 5/1949 | Polleys | 12—86.6 |
| 3,006,006 | 10/1961 | Polleys | 12—86.6 |
| 3,226,748 | 1/1966 | Godet | 12—88 |

PATRICK D. LAWSON, *Primary Examiner.*